United States Patent [19]

Marshall

[11] Patent Number: 5,054,207
[45] Date of Patent: Oct. 8, 1991

[54] DIMENSION CHECKING APPARATUS FOR VEHICLES

[75] Inventor: D. Ray Marshall, Forest, Ohio
[73] Assignee: Race Spec, Inc., Forest, Ohio
[21] Appl. No.: 448,399
[22] Filed: Dec. 11, 1989
[51] Int. Cl.⁵ .............................................. G01D 21/00
[52] U.S. Cl. ........................................ 33/600; 33/608; 33/288; 33/203.12
[58] Field of Search .................. 33/600, 608, 613, 644, 33/645, 568, 572, 228, 288, 501.05, 203.12, 203.15, 203.17, 203.18, 203.21, 264, 286; 177/136, 33; 72/705

[56] References Cited

U.S. PATENT DOCUMENTS

| | | | |
|---|---|---|---|
| 3,758,958 | 9/1973 | Jordan | 33/203.15 |
| 3,895,681 | 7/1975 | Griffin et al. | 177/136 |
| 4,498,243 | 2/1985 | Kashiwaga | 33/600 |
| 4,561,187 | 12/1985 | Powell | 33/288 |
| 4,605,081 | 8/1986 | Helmly, Jr. et al. | 364/567 |
| 4,630,380 | 12/1986 | Donahue | 33/600 |
| 4,663,855 | 5/1987 | Hamilton et al. | 33/600 |
| 4,679,327 | 7/1987 | Fouchy et al. | 33/288 |
| 4,683,663 | 8/1987 | Sarauer | 33/288 |
| 4,811,250 | 3/1989 | Steber et al. | 33/608 |
| 4,905,496 | 3/1990 | Venäläinen | 72/705 |

Primary Examiner—William A. Cuchlinski, Jr.
Assistant Examiner—Alvin Wirthlin
Attorney, Agent, or Firm—Joseph G. Nauman

[57] ABSTRACT

A mobile vehicle measuring device for the measuring of a vehicle, such as a race car, from certain reference points such as the bottom side of the vehicle instead of the driving surface. The apparatus comprises a level support platform with adjustable wheel plates to center the vehicle, a movable lift gauge rack to provide reference points for various measuring gauges, a vehicle loading device, a vehicle load measuring device and various preset measuring gauges cooperating with the lift gauge rack to check efficiently all pertinent measurements with which the vehicle must comply.

10 Claims, 7 Drawing Sheets

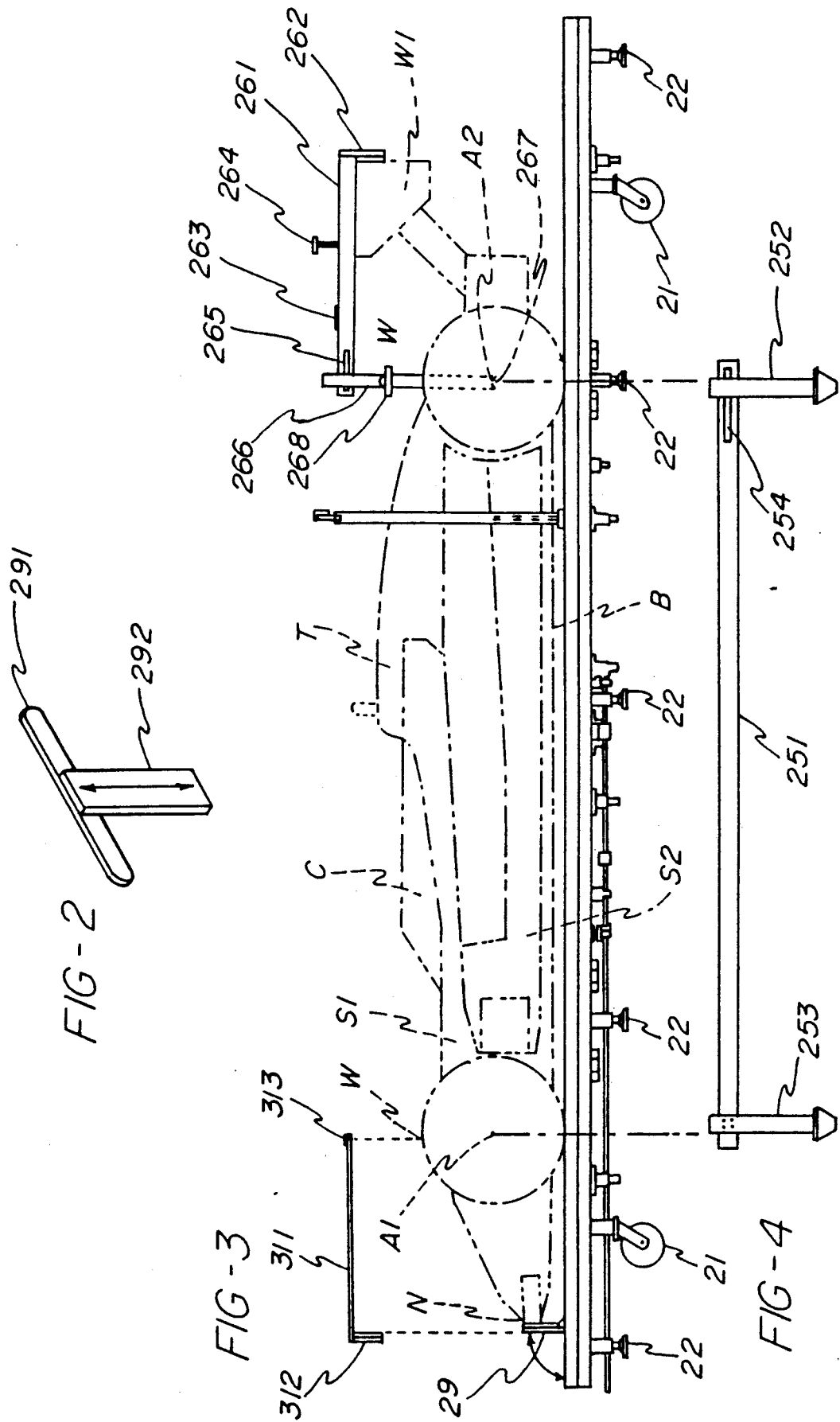

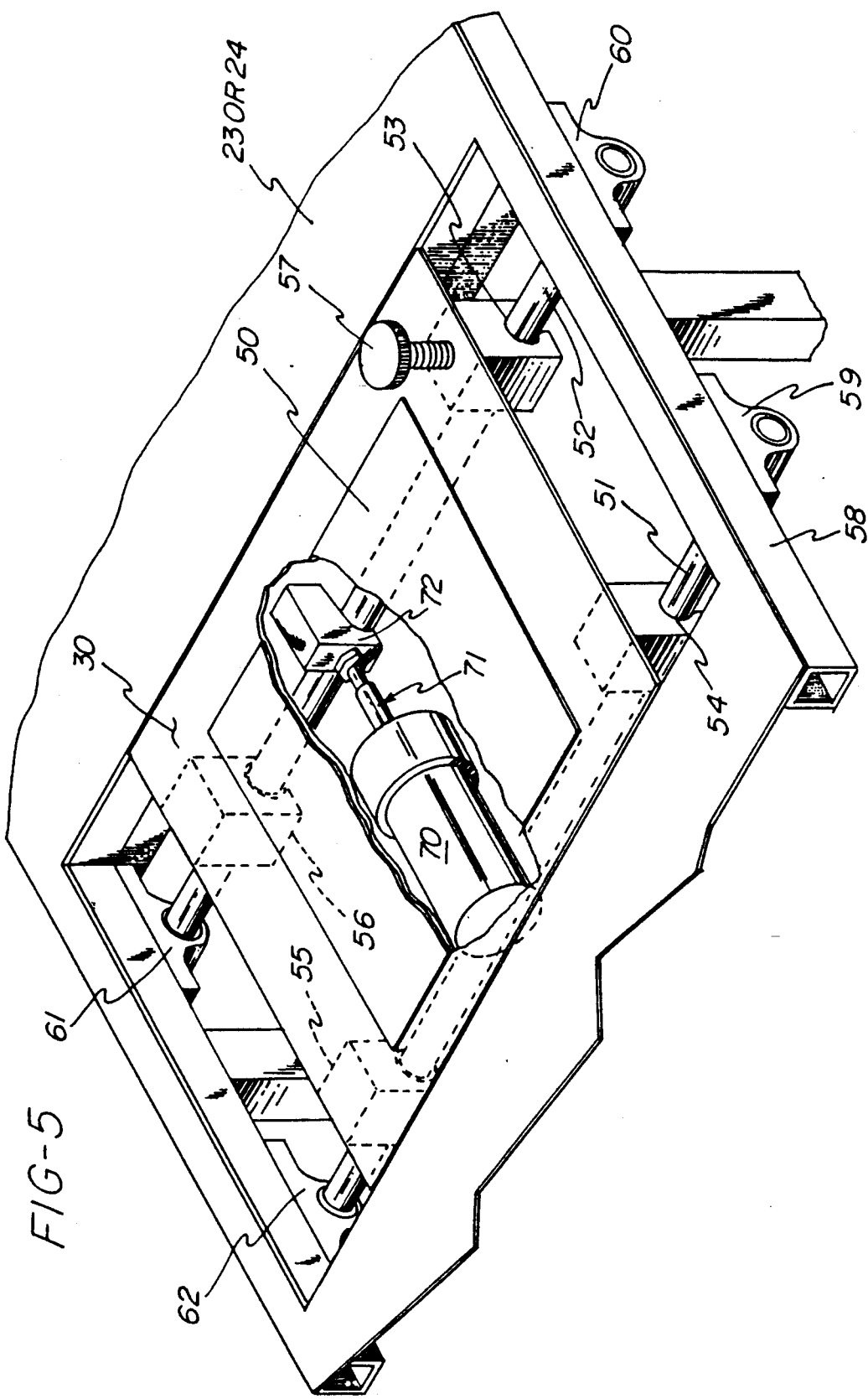

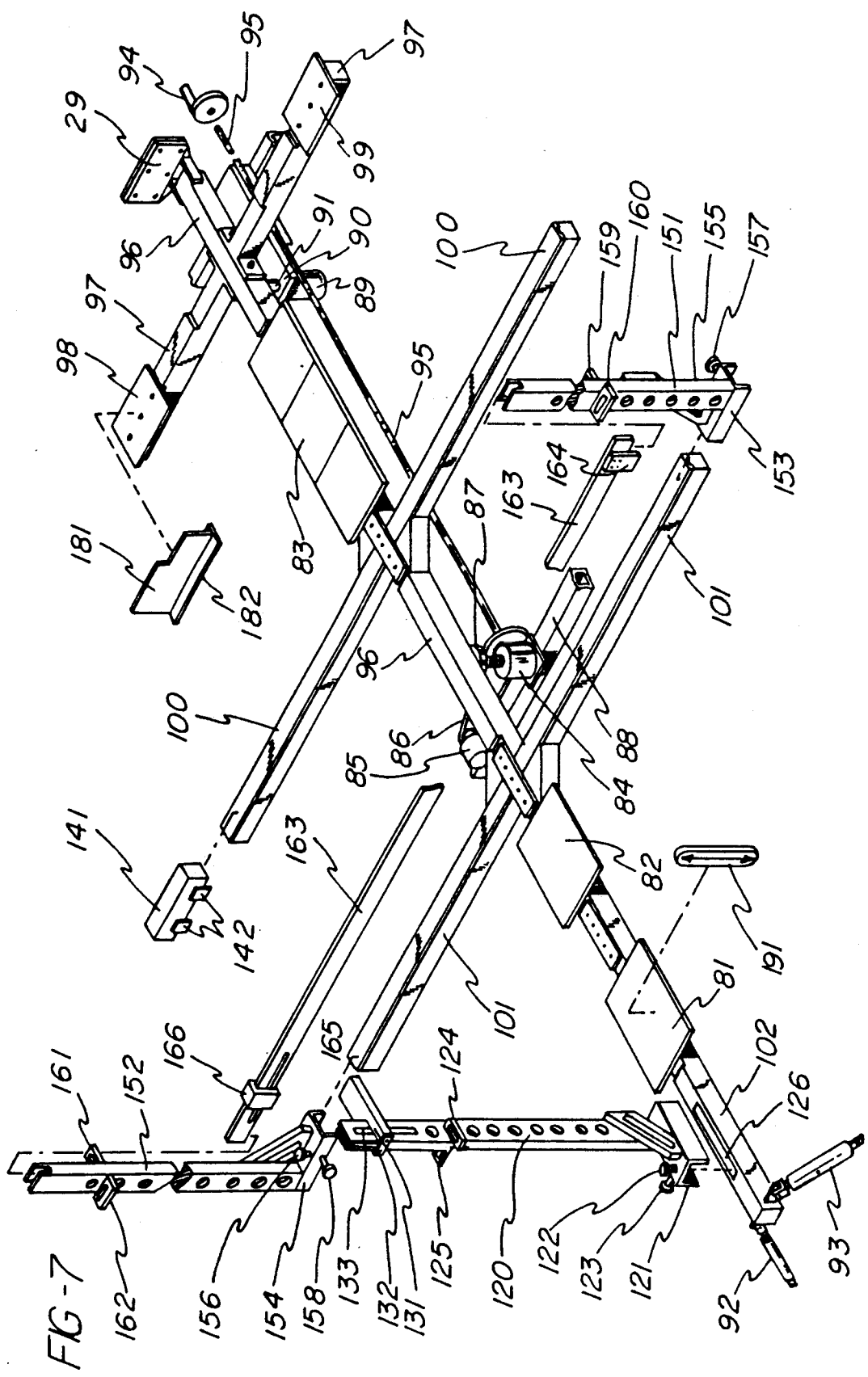

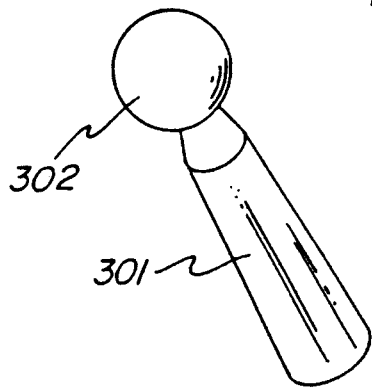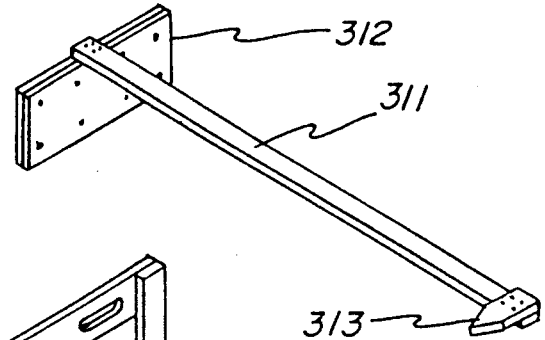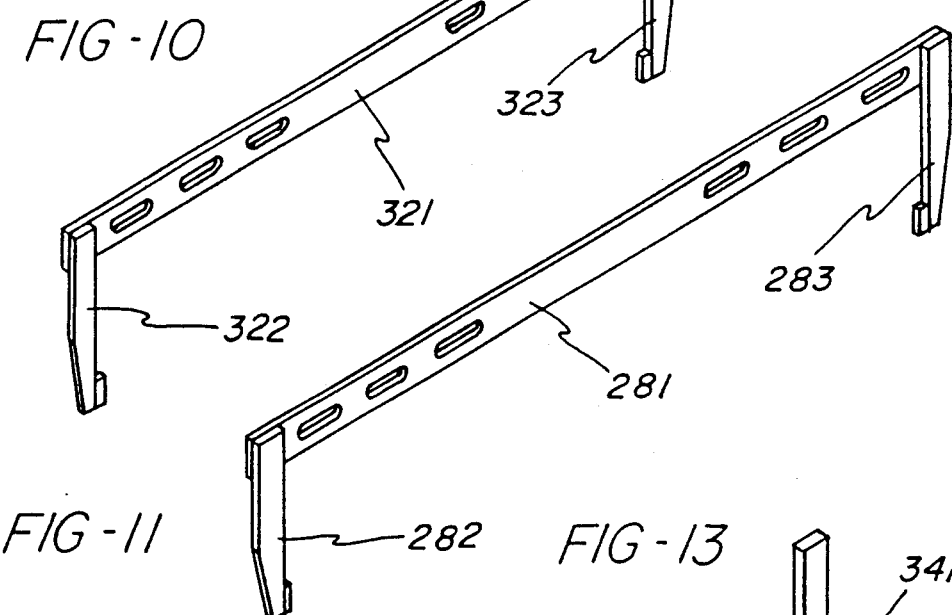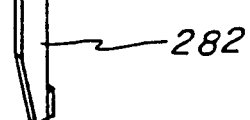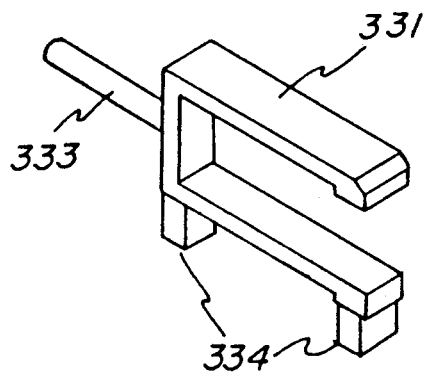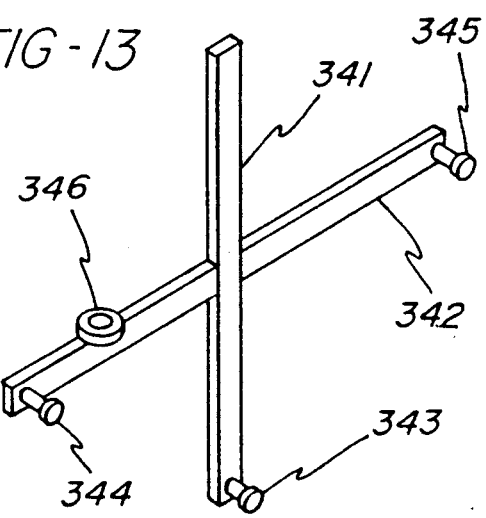

DIMENSION CHECKING APPARATUS FOR VEHICLES

BACKGROUND OF THE INVENTION

This invention relates to apparatus for measuring the dimensions on a vehicle, such as a race car, were a vehicle must conform to certain predetermined specifications.

When a vehicle enters into a race, it must comply to certain predetermined dimensional specifications. A consistent accurate form of measurement must be utilized in order to determine if each vehicle falls within these specifications. The measurements for these specifications are taken from various reference points on a vehicle. Some of these reference points are the bottom tub, the front nose or the sides of a vehicle.

The specification measurements of a vehicle were previously measured by a hand held rule, which was held at the specific reference points at which the measurements were to be taken. This way of measuring the specific dimensions was tedious, time consuming, and inaccurate.

Thus, a more accurate and less time consuming measuring device which is mobile and can be used anywhere would be particularly useful in checking the compliance of the vehicle with predetermined rules or criteria, especially in instances where every vehicle entering a race must pass a compliance test each time those vehicles enters a race track for an official purpose, e.g. qualifying or racing.

SUMMARY OF THE INVENTION

Briefly, the present invention comprises a system and apparatus for measuring the predetermined specifications of a vehicle in order to determined whether such vehicle complies within such specifications. The system is useful particularly in checking race cars for compliance with regulations of a governing body of a racing competition.

The apparatus preferably includes; support platforms, adapted to receive a vehicle, which adjust and maintain such vehicle's longitudinal centerline parallel to and intersecting the center vertical plane midway between the support platforms; a longitudinal lift rack with its centerline intersecting such center vertical plane of the support platform; latitudinal bars which extend from the lift rack and outward from underneath such vehicle, and which are utilized as reference points for measuring with preset gauges; a loading device which is adjustable and attached to such vehicle, and a gauge to measure the deflection of the vehicle caused by such load; and several preset gauges used to measure several dimensions on such vehicle.

The principle object of this invention is to provide a system and apparatus for measuring a vehicle from certain reference points, which uses a master reference device that conforms to these reference points whereby various other preset gauges can be utilized to make the specification measurements expedient and accurate; to provide a level support to adjust and maintain the vehicle in a proper position to make accurate measurements; to provide apparatus cooperable with the level support to weight the vehicle expediently; to provide apparatus for loading and measuring the deflection caused by such load on a vehicle to determine if such vehicle complies with set specifications; and to provide apparatus for measuring certain parts of a vehicle to determine if such vehicle conforms to predetermined specifications.

Other objects and advantages of the invention will be apparent from the following description, the accompanying drawings and the appended claims.

BRIEF DESCRIPTION OF THE DRAWINGS

In the detailed description below, reference will be made to the following drawings:

FIG. 2 is a perspective view of the tunnel width gauge;

FIG. 3 is a side view of the measuring device of the invention with rear wing set back, front wing set, and width gauges incorporated with the preferred embodiment, and a race car shown thereon in phantom lines;

FIG. 4 is top view of the centerline wheelbase gauge;

FIG. 5 is a perspective view of the adjustable wheel plates of the preferred embodiment;

FIG. 7 is a perspective view of the lift gauge rack incorporated with length, height, width, side pod height, tunnel height and wing height gauges;

FIG. 8 is a perspective view of the wheel clearance gauge;

FIG. 9 is a perspective view of the front wing set gauge;

FIG. 10 is a perspective view of the front wing width gauge;

FIG. 11 is a perspective view of the rear wing width gauge;

FIG. 12 is a perspective view of the wing thickness and length gauge; and

FIG. 13 is a perspective view of the wheel to wheel width gauge.

DESCRIPTION OF THE PREFERRED EMBODIMENT

Figure 1:
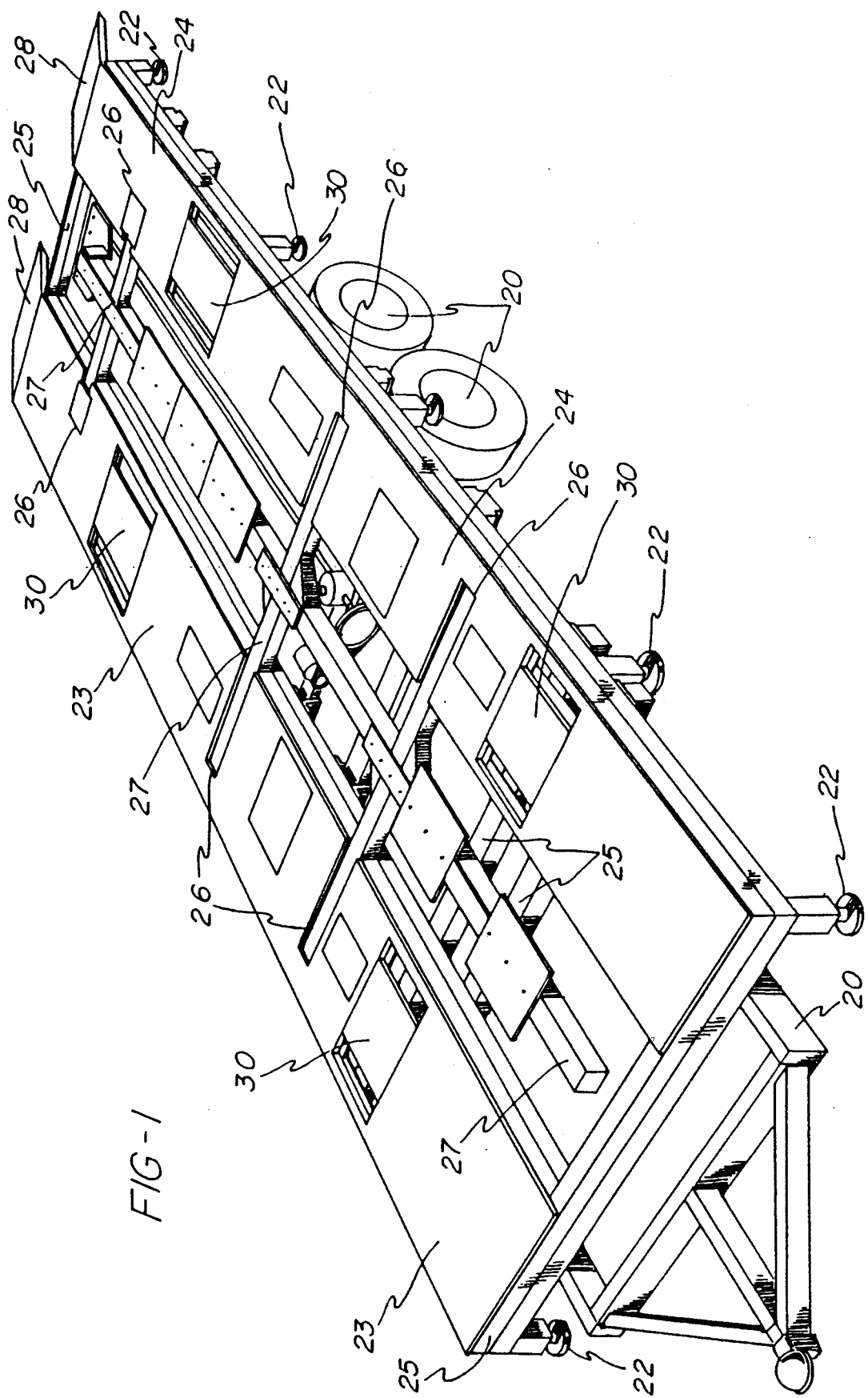
FIG. 1 is a perspective view of the measuring device of the preferred embodiment, incorporated on a trailer.

The entire system, as shown in FIG. 1, is loaded on a trailer 20 for long distance travel and in FIG. 3 is made mobile by attached wheels 21 for short distance travel, which are removed after the device is in position to operate. The device is then leveled by lasers on the operating or supporting surface by adjusting the support stands 22. Such a surface may be a garage floor or a paved pad in the vicinity of a race track.

Referring to FIGS. 1 and 3, the level support and measuring device comprises two support platforms 23 and 24 defining a horizontal plane with a longitudinal axis parallel to and midway between the support platforms (hereafter the centerline axis). The support platforms 23 and 24 are held in position by cross-members 25 and support stands 22. Notches 26 are cut out of the support platforms 23 and 24 in order for the lift gauge rack 27 to retract into the support platforms 23 and 24. A vehicle is then moved up the ramps 28 onto the support platforms 23 and 24, the nose of such vehicle is positioned against the nose stop 29 which is fixed onto the lift gauge rack 27, and at this point the wheels of a vehicle are located on the wheel support plates 30 and chacked into place. The nose stop 29 may detract down in order for a vehicle to be moved forward off the support platforms 23 and 24, if desired.

FIG. 4 shows a typical race car in phantom lines. Although the configurations of such cars are unique, they have certain common features. Thus, the vehicle or car is supported on wheels W which are suspended at fore and aft axle centers A1 and A2, and the car has a body with a nose portion N, a top T, a bottom B, sides S1 and a cockpit (the drivers position) C. Side pods S2 project laterally from the lower part of the body sides S1, and typically extend from a location slightly aft of the front wheel to adjacent the rear wheels. Most such cars have a controllable wing member W which is supported aft of and above the rear wheels. The specifications mentioned at the outset will determine the relative locations, size, and/or dimensions of these parts of the car, and the car must thus be assessed for it physical compliance with the specification standards.

A means for weighing the vehicle may be incorporated in support plates 30 (FIG. 5) by equipping the plates with load cells 50 for measuring the overall weight of a vehicle.

In FIG. 5 the wheel support plates 30 are adjustable latitudinally with respect to the support platforms 23 or 24, in order to center the vehicle, with its centerline axis intersecting the vertical plane of the centerline axis of the support platforms 23 and 24.

As shown in FIG. 5, each wheel support plate 30 is mounted onto slide bearings 53, 54, 55 and 56, slide along two guide rods 51 and 52 mounted below the support platform 23 or 24 on cross member 58 by means of four clamps 59, 60, 61 and 62. The support plate 30 will lock with locking screws 57, or by air cylinder lock 70. Air cylinder lock 70 is mounted to the bottom of the wheel support plate 30 and piston rod 71 of the air cylinder 70 is secured to stop 72 which presses against guide rod 52 to fix the position of the wheel support plate 30. The air cylinder lock 70 is controlled in the front, for both the front and rear wheel support plates 30, or controlled in the rear, for the rear support plates 30, to maintain the support plate 30 in position once the vehicle is centered.

Figure 6:
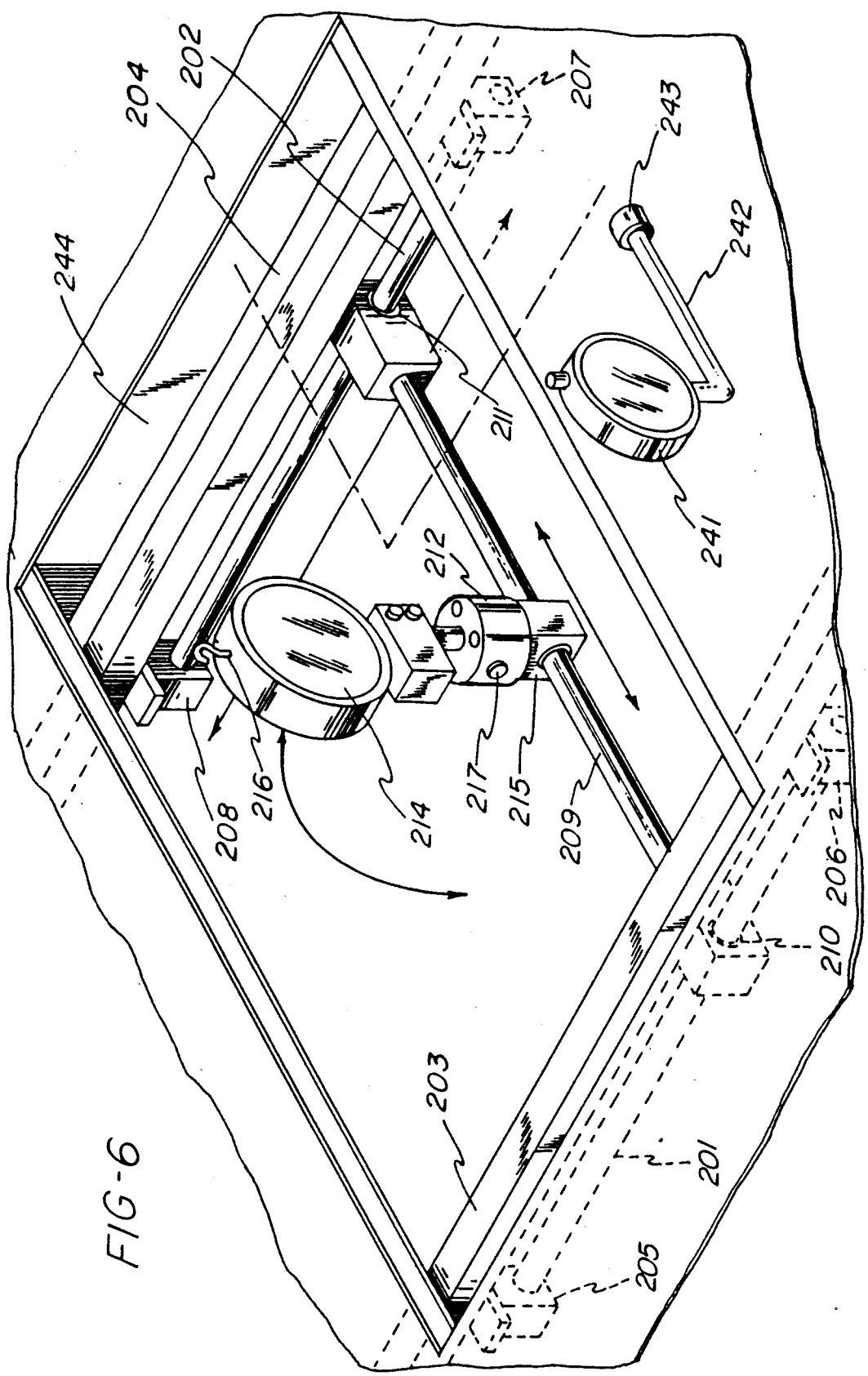
FIG. 6 is a perspective view of the load and measuring device of the preferred embodiment.

A means to load the side pods, shown in FIG. 6, comprises two guide rods 201 and 202, circular in cross-section and parallel to each other, and fixed to the cross-members 203 and 204 of the support platform by clamps 205, 206, 207 and 208. One guide rod 209 has a circular cross-section, which is connected to the two fixed guide rods 201 and 202 with slide bearings 210 and 211. The loading device is a pneumatic load cylinder 212, fixed to pressure gauge 214, which can be set for the predetermined load by a regulator valve. The load cylinder 212 is attached to the guide rod 209 with a slide bearing 215, which allows the load cylinder 212 to self-center to the load applied. The load guage 214 is attached to a vehicle by hook 216. The vehicle is equipped with appropriate openings to attach the load cylinder hook 216 to the side pods of such vehicle. The load cylinder 212 is activated by button 217, which therein applies the predetermined load to the side pod of such vehicle.

The means for measuring the deflection of the side pod under such load is shown in FIG. 6, comprises a dial indicator 241 mounted on a holding shaft 242 which is bent at a ninety degree angle. The holding shaft 242 is mounted on a magnet 243 which adheres to the cross-member 244 of the support platform. The dial indicator 241 is positioned against the bottom of the side pod of the vehicle, and when the load cylinder is engaged the deflection of the side pod is measured.

FIG. 7 shows the means provided for conforming to a vehicle's bottom side for providing reference points, comprising the lift gauge rack 27 which lifts upward until its lower gauge plates 82 and 83, meet the bottom of the vehicle. The lift gauge rack does not lift such vehicle, but merely conforms to the rake and tilt angle of the bottom side of such vehicle. The lift gauge rack 27 is lifted by a motor driven screw jack 84 consisting of a motor 85, (preferably pneumatic) which drives screw jack 84 with a link chain 86, located in the center of the lift gauge rack. The screw jack is fixed to the lift gauge rack by a ball joint 87 and the base of the screw jack 84 is fixed to the support platform cross-arm 88. The lift gauge rack is stabilized by an air cylinder 89 whose base is fixed to the support platform cross-arm 90, and fixed to the lift gauge rack with a ball joint 91, to assure accurate conforming to a vehicles bottom surface. The lift gauge rack is stabilized by two compliant stabilizer struts 92 and 93 at the rear. If the motor 85 fails to lift the lift gauge rack, a hand crank 94, attach to a drive shaft 95, which turns the screw jack 84, may provide a manual means to operate the lift gauge rack.

The lift gauge rack (FIG. 7) comprises one longitudinal gauge bar 96, lower gauge plates 81, 82 and 83, a nose stop 29, a wing gauge bar 97, wing gauge plates 98 and 99, a front side pod gauge bar 100, rear side pod gauge bar 101 and a rear gauge bar 102. The front and rear side pod gauge bars (respectively 100 and 101) extend out beside the vehicle body. All top sides of gauge bars and plates of the lift gauge rack are flush with the same horizontal plane. The lower gauge plates 81, 82 and 83 are interchangeable with other plates depending upon the type of vehicle to be measured. The rear gauge bar 102 extends out behind the back of the vehicle. While the lift gauge rack is positioned against the bottom of a vehicle, various measurements are made with several gauges cooperable with the lift gauge rack mentioned hereafter. The lift gauge rack, when positioned against the bottom of the vehicle, provides a base reference for measurements, according to specific or individual sanctioning body specifications.

A means is provided to measure the length of a vehicle in FIG. 7, comprises length gauge mounted on the rear gauge bar 102. The length gauge is a vertical bar 120 of rectangular cross section, with a U-shaped horizontal base bar 121 secured to the vertical bar 120. The horizontal base bar 121 has two adjusting screws, one adjusting horizontally 122 and the other adjusting vertically 123. Two levels 124 and 125 are mounted on the side of the vertical bar 120 for the leveling of the vertical bar 120. The length measurement is taken, once the length gauge is flush against the rear wing of a vehicle and leveled, from the precision scale 126 mounted on rear gauge bar 102.

A means to measure the overall height of a vehicle is also shown in FIG. 7, comprising height gauge used in cooperation with the length gauge. The height gauge includes a rectangular plate 131 with a rectangular hole 132 in one end. The height gauge slides onto the length gauge and the height is measured from the precision scale 133 mounted on the length gauge.

A means to measure the side pod height of a vehicle is shown in FIG. 7, comprising a block 141 with specific dimensions and two fixed guides 142 on one side. The block 141 is slid on top of the side pod gauge bars, front bar 100 and rear bar 101, to measure if the side pod's height, with reference to the bottom of the vehicle, conforms with predetermined specifications.

Figure 14:
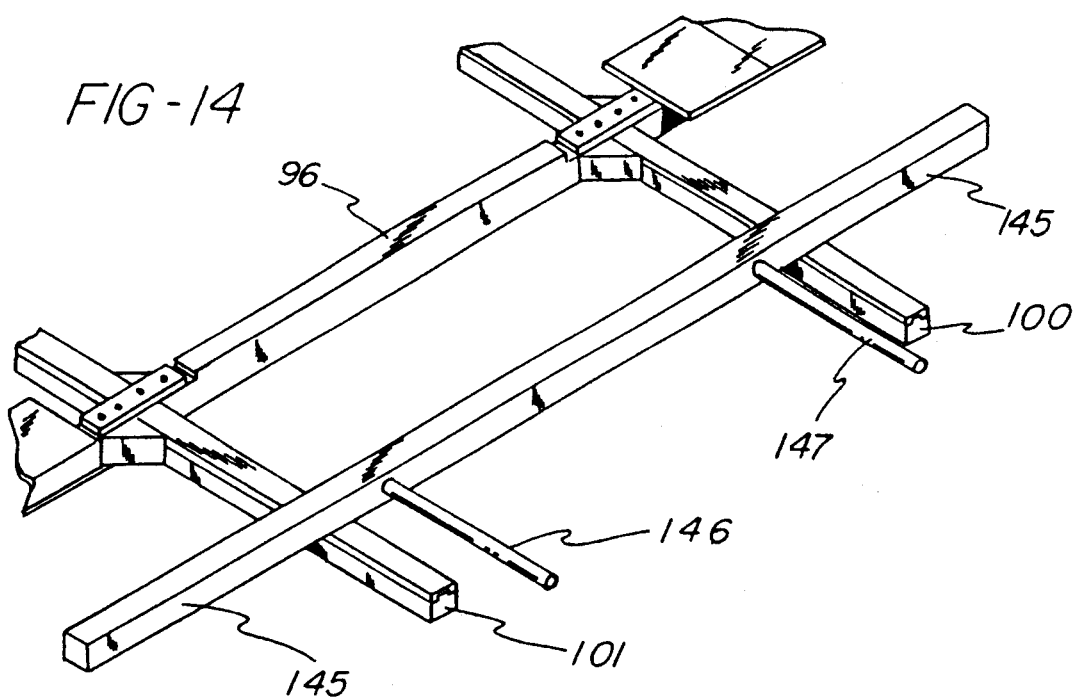
FIG. 14 is a perspective view of the side pod height gauge.

An alternative means to measure the side pod height of a vehicle is shown in FIG. 14, comprising a bar 145 with specific dimensions and two bars 146 and 147 mounted perpendicular to one side of bar 145 as handles. The bar 145 is slid on top of the side pod gauge bars, front bar 100 and rear bar 101, to measure if the side pod's height, with reference to the bottom of the vehicle, conforms with predetermined specifications.

Means for measuring the width of a vehicle's body is shown in FIG. 7, comprising width gauges mounted on the rear 101 or front 100 side pod gauge bars. The width gauges consist of two vertical bars 151 and 152 with a rectangular cross section, with U-shaped horizontal base plates 153 and 154 fixed to the respective vertical bars 151 and 152. Each horizontal base plate 151 and 152 has two adjusting screws, one adjusting horizontally (155 and 156), and one adjusting vertically (157 and 158). Levels 159, 160, 161 and 162 are mounted on the sides of vertical bars 151 and 152, for leveling thereof. A horizontal bar 163 is set on the two vertical bars 151 and 152, with stop 164, on the horizontal bar 163, flush with one of the vertical bar's 151 or 152 inside edge. The width measurement is then taken from the scale 165 mounted on the horizontal bar 163, when the slide reference 166 is positioned flush against the inside edge of the vertical bar 151 or 152.

Figure 15:
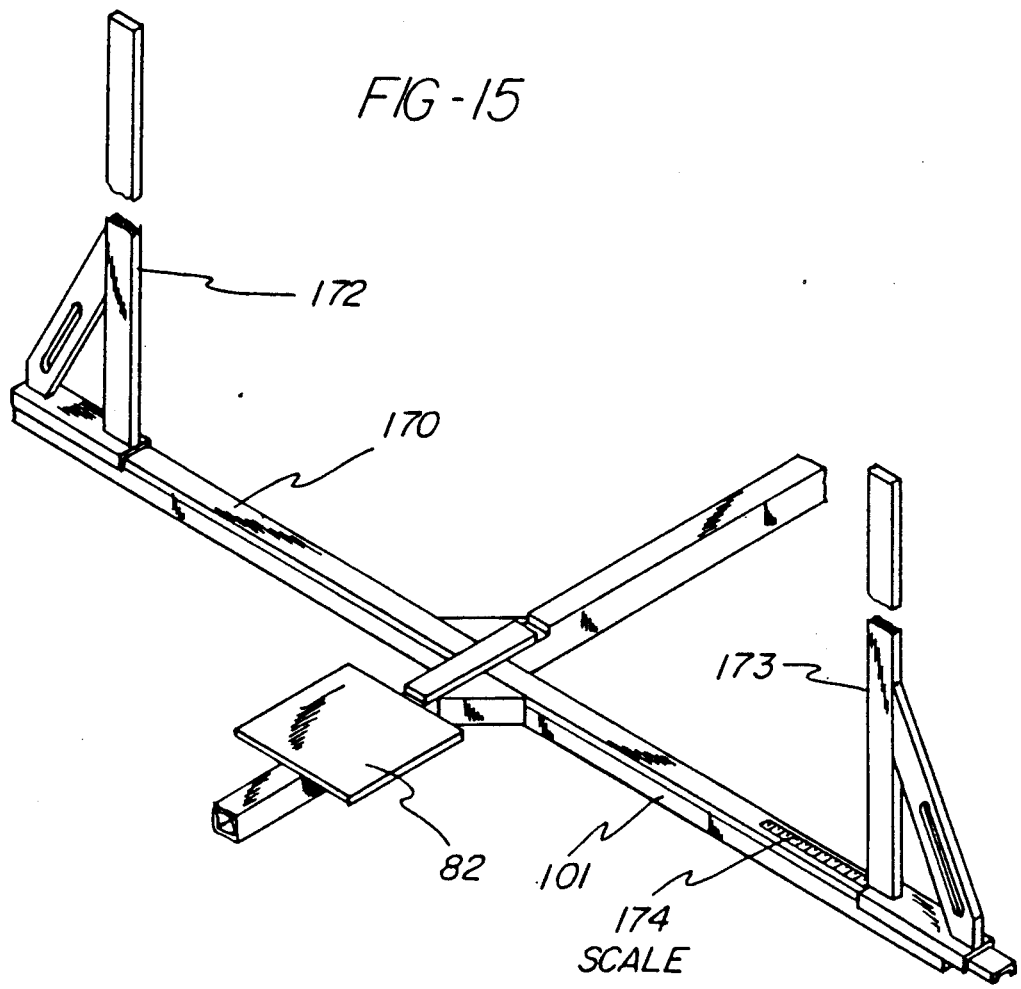
FIG. 15 is a perspective view of the width gauges.

An alternative to the measuring the width of a vehicle's body is also shown in FIG. 15 comprising width gauge bars 170 recessed on rear 101 or front 100 side pod gauge bars. The width gauge bar 170 is movable and recessed in the side pod gauge bar 101. At one end of the width gauge bar 170, a vertical bar 172 is secured at a reference point on the width gauge bar 170. The vertical bar 172 is slid up against the side pod of the vehicle, thereby allowing the width gauge bar 170 to move along its recessed position in the side pod gauge bar 101. At the other end of the width gauge bar 170, vertical bar 173 is mounted flush against the side pod of the vehicle. The width of the vehicle is then taken from a scale 174 mounted to the width gauge bar 170 at the point where the vertical bar 173 meets the scale 174.

A means to measure the front wing height of a vehicle is also shown in FIG. 7, comprises vertical plate 181 which is preset to a specific height, and mounted on a small base 182, which is then slid along the front wing gauge plate 98. This determines the clearance of the front wing of a vehicle with reference to the bottom side of such vehicle.

Also in FIG. 7, a means to measure the side pod tunnel height is shown comprising a bar 191, which is cut to a predetermined length and rounded on both ends, and set vertically on the rear lower gauge plate 81. This determines if the clearance, of the side pod tunnel of a vehicle with reference to the bottom side of such vehicle, conforms to the specifications.

Means for measuring the front wheel centerline to the rear wheel centerline of the vehicle is shown in FIG. 4, comprising longitudinal bar 251, and two latitudinal bars 252 and 253. The latitudinal bar 252 is adjustable longitudinally on bar 251 and positioned at the centerline of the front wheel or the rear wheel. The other latitudinal bar 253 is fixed at one end of bar 251, and positioned at the opposite wheel's centerline. The centerline measurement is then read from the scale 254 mounted on the longitudinal bar 251.

A means for measuring the rear wing set back is shown in FIG. 3, comprising longitudinal bar 261, mounted on bar 261 are, end plate 262 fixed vertically at one end, a bubble level 263, a level adjusting screw 264 provided for leveling bar 261, and a scale 265. A vertical bar 266 with a notch 267 at one end is set on the rear wheel axis of a vehicle. A bubble level 268 is mounted on the side for leveling the vertical bar 266. The rear wing set back measurement is taken from the scale 265 when the longitudinal bar 261 and the vertical bar 266 are leveled.

A means for measuring the side pod tunnel width is shown in FIG. 2, comprising bar 291 of predetermined length, which is fixed perpendicular to a plate 292. The measure bar 291 is then positioned inside the side pod tunnel of a vehicle, and the width of such side pod must not be shorter than the length of bar 291.

A means for measuring the rear wing width is shown in FIG. 11, comprises longitudinal bar 281 of predetermined length, and latitudinal bars 282 and 283 fixed at each end. Bar 281 is then positioned horizontally so that the rear wing fits between bars 282 and 283. The rear wing width must not be greater than the distance between bars 282 and 283, in order to conform to specific sanctioning body specifications.

In FIG. 8, a means for measuring the clearance of the wheel and the body of a vehicle is shown, comprising handle 301, which is fixed to a sphere 302. The sphere 302 has a diameter that is predetermined from specific sanctioning body specifications and the clearance between the wheel and any part of such vehicle's body must be greater than said diameter.

A means of measuring the front wing set is shown in FIG. 9 and 3, comprising latitudinal bar 311, a vertical plate 312, which is fixed at one end, and a pointer 313 fixed at the other end of bar 311. The pointer 313 is then position at the front wheel centerline of a vehicle and the vertical plate 312 must clear the front wing of such vehicle, in order to conform with the front wing set specification.

FIG. 10 shows a means for measuring the front wing width of a vehicle, comprising longitudinal bar 321, with predetermined length, and two latitudinal bars 322 and 323 fixed at each end. Bar 321 is then positioned horizontally so that the rear wing fits between bars 322 and 323. The front wing width must not be greater than the distance between bars 322 and 323, in order to conform to specifications.

As shown in FIG. 12, a means for measuring the front wing length and thickness of a vehicle, comprising U bar 331, with a set predetermined distance between the inside edges, and handle 333, which is fixed to the bottom of the U bar 331. The U bar 331 is then positioned around the front wing, and in order to conform to the specifications, the front wing thickness of a vehicle must be less than the distance between the inside edges of U bar 331. The length of the front wing is determined to be within specifications by notch 334 cut out of one end of U bar 331, with a predetermined length so that the notched end of U bar 331 can set on top of the front wing of the vehicle, and the length clearance of the front wing obtained.

A means to measure the width of a vehicle from wheel to wheel is shown in FIG. 13, comprises vertical cross bar 341, with an adjustable wheel set 343 mounted on one end, a horizontal cross bar 342 fixed to the vertical cross bar 341 at the center, wheel sets 344 and 345 fixed at a distance thereby engaging the wheel at the rim's edge, and a bubble level 346 mounted to the vertical cross bar 342. There are two of these wheel width gauges positioned against the front or rear wheels of the vehicle then leveled, and the distance between them is measured for the width.

In summary, the vehicle is moved onto the support platforms and centered by adjusting the wheel support plates. Once in position, the vehicle is weighed. Then the lift gauge rack is positioned against the bottom of the vehicle and the length, heights, and widths of the vehicle and its various parts are measured. The lift gauge rack is then retracted from the vehicle and the side pods are loaded and measured. The lift gauge rack may be raised or retracted when the various other measurements are taken, such as wing sets, wing widths, wing lengths, front wing thickness, wheel to body clearance, and wheel centerline to wheel centerline. After all the measurements are taken, the vehicle is then moved off the support platforms.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A device for verifying the compliance of a wheeled race car vehicle which includes a body having a bottom and sides extending upward from the bottom, to predetermined racing qualification specifications, said device comprising
   a level support platform defining a horizontal plane and adapted to receive the vehicle with its longitudinal axis parallel to and midway of said support platform, and laterally adjustable plates in said support platform adapted to receive the wheels of the vehicle for positioning the vehicle with its longitudinal axis parallel to the longitudinal axis of the horizontal plane of said support platform,
   a movable lift gauge rack supported on said platform in a normally retracted position over which the vehicle can be moved onto said plates and means for raising said rack against the bottom of the vehicle for conforming to the rake and tilt of the vehicle's bottom,
   a length gauge cooperable with said lift gauge rack for measuring the overall length of the vehicle,
   a height gauge cooperable with said lift gauge rack and said length gauge for measuring the overall height of the vehicle,
   width gauges cooperable with said lift gauge rack for measuring the width of the vehicle,
   a side pod height gauge cooperable with said lift gauge rack for measuring the distance between a side pod on the vehicle and the vehicle's bottom,
   a side pod tunnel height gauge cooperable with said lift gauge rack for measuring the height of a side pod tunnel on the vehicle,
   side pod loading means and a deflection gauge for measuring the deflection of a side pod on the vehicle when a predetermined load is applied to such side pod by said loading means while the vehicle is on said level support, and
   a front wing clearance gauge cooperable with said lift gauge rack for measuring the clearance between a front wing on the vehicle and the vehicle's bottom.

2. The device of claim 1 wherein said wheel support plates include means for weighing the vehicle and displaying resultant weight information.

3. An apparatus for verifying the compliance of a race car vehicle having wheels for supporting and propelling the vehicle and a body including a top, a bottom, and sides, to predetermined qualification specifications, said apparatus comprising
   a vertically movable and tiltable lift gauge rack having a longitudinal axis, said rack normally being in a retracted position whereby the vehicle can be placed and centered over said rack,
   means for supporting the vehicle over said rack with said rack's longitudinal axis coincident with a vertical plane through the vehicle's longitudinal centerline,
   means for raising and adjusting said lift gauge rack to conform to rake and tilt of the vehicle's bottom, such that said lift gauge rack does not support the vehicle weight, and
   said lift gauge rack having latitudinal gauges extending outward from said longitudinal axis providing a means to measure at least the length, height and width of the vehicle with respect to said lift gauge rack.

4. The apparatus of claim 3 including a length gauge cooperable with said lift gauge rack and removably mounted onto said lift gauge rack in a predetermined location at the rear of the vehicle for measuring the length of the vehicle.

5. The apparatus of claim 4 including a height gauge cooperable with said length gauge, said height gauge being removably fitted in a predetermined location onto said length gauge for measuring the height of the vehicle.

6. The apparatus of claim 3 including width gauges cooperable with said lift gauge rack and installed onto said lift gauge rack for measuring the width of the vehicle body with reference to said rack.

7. The apparatus of claim 3 including a side pod height gauge cooperable with said lift gauge rack and installed onto said lift gauge rack for measuring the distance between the bottom and the side pods of the vehicle body.

8. The apparatus of claim 3 including a side pod tunnel height gauge cooperable with said lift gauge rack and installed on said lift gauge rack for measuring the distance between the bottom and the side pod inside tunnel of the vehicle.

9. The apparatus of claim 3 including a wing front height gauge cooperable with said lift gauge rack and installed on said lift gauge rack to be located adjacent the rear of the vehicle positioned over said rack for measuring the distance between the bottom and the front of a wing fitted to the vehicle.

10. A device for verifying the compliance of a race car vehicle having wheels located on front and rear axle centers for supporting and propelling the vehicle and a body including a top, a bottom, and sides having side pods extending laterally therefrom, the body being fitted with a wing member to predetermined qualification specifications, said device comprising
    a support platform adapted to receive the vehicle and defining a horizontal base plane with a longitudinal axis parallel to and midway of said support platform and to position the vehicle on said platform with its longitudinal centerline parallel to said longitudinal axis of the base plane of said support platform,
    adjustable wheel support plates located in said support platform and adjustable along latitudinal axes in said horizontal base plane for support of the wheels of a vehicle moved onto said support plates and for adjustment of the longitudinal centerline of the vehicle into coincidence with a vertical plane containing said longitudinal centerline, said device further comprising a cooperating set of gauges constructed to conform to the specifications and supportable on said platform for interaction with the vehicle thereon said gauges including, a wheel base gauge for the measuring of the rear wheel centerline from the front wheel centerline on the vehicle, a rear set-back gauge for measuring the wing setback from the rear axle of the vehicle, a rear wing width gauge for measuring the width of the vehicle's rear wing, a side pod tunnel width gauge for the measuring of the width of a side pod tunnel of the vehicle, a wheel clearance gauge for the measuring of the distance between the wheel and the body of the vehicle, a front set gauge for measuring the distance of the leading edge of the front wing from the front wheel centerline of the vehicle, width gauges for measuring the width of the vehicle with reference to the wheel rims of the vehicle, a front wing width gauge for measuring the width of the vehicle's front wing, and a front wing gauge for measuring wing thickness and wing length of the vehicle.

* * * * *